March 2, 1971     H. O. BORCK     3,566,633
STEERING COLUMN LOCK
Filed Nov. 7, 1968
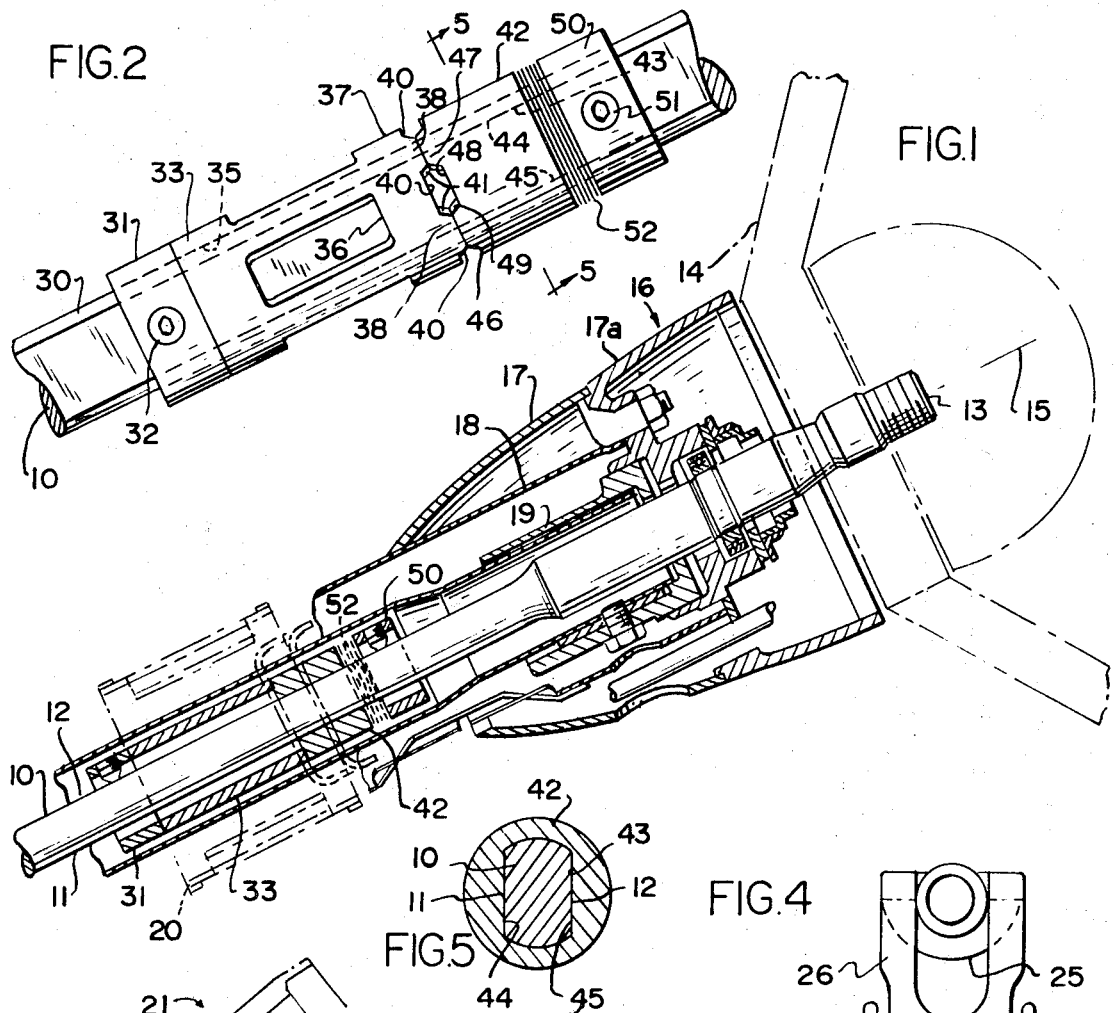
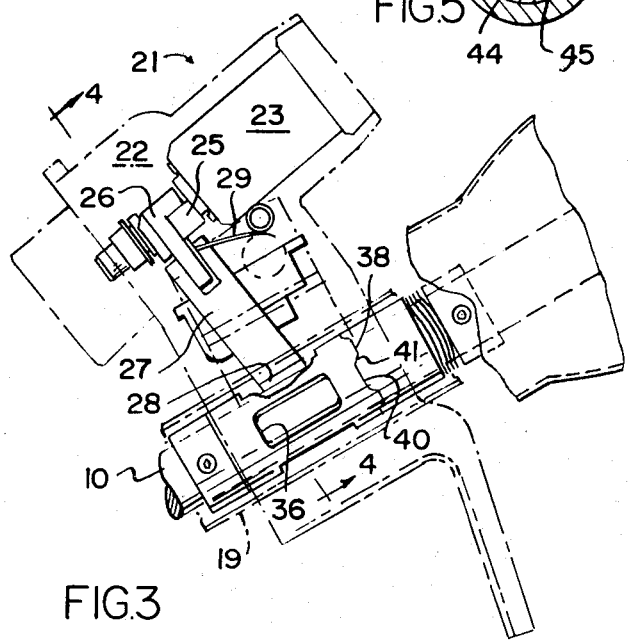
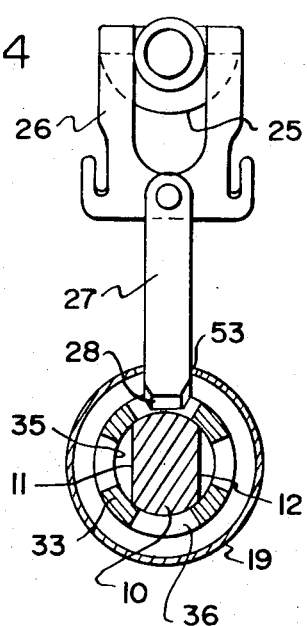
INVENTOR
HOWARD O. BORCK
BY John W Butcher
ATTORNEY

United States Patent Office 3,566,633
Patented Mar. 2, 1971

3,566,633
STEERING COLUMN LOCK
Howard O. Borck, Detroit, Mich., assignor to Borg-Warner Corporation, Chicago, Ill.
Filed Nov. 7, 1968, Ser. No. 774,005
Int. Cl. B60r 25/02, 25/06; E05b 65/12
U.S. Cl. 70—252                                   28 Claims

ABSTRACT OF THE DISCLOSURE

A lock for steering columns of motor vehicles associated with an ignition switch which lock engages a torque limiting clutch providing a strong torque resistance to turning the steering wheel. When a predetermined value of torque has been exceeded the elements of the torque limiting clutch will dissociate allowing rotation of the steering wheel through a predetermined arc at which point said clutch will re-engage to again resist rotation of the steering wheel.

SUMMARY OF THE INVENTION

Safeguard mechanisms operating generally as anti-theft devices have long been incorporated in motor vehicles in addition to the standard ignition lock. One such device is a steering column lock which, when activated, operates to restrain the steering shaft against rotation thereby restraining turning of the steered set of vehicle wheels and discouraging a theft of the vehicle.

A problem presently exists in those steering column locks which restrain rotation of the steering shaft. It seems there is a tendency on the part of vehicle thieves to attempt to overcome the restraint imposed on the steering shaft by the lock by the use of excessive force, for instance the application of a pipe wrench to the steering wheel. Thus there is a need for a lock mechanism which cannot be broken by use of excessive force.

Most locks which are not susceptible to easy destruction when excessive force is applied result in damaged steering components which can only be repaired or replaced at relatively large cost to the vehicle owner. The present invention provides a steering column lock which prevents damage to the steering components in the event that excessive force is applied to overcome the restraints imposed by the lock.

The present invention further provides a steering column lock in which application of a predetermined "break-away torque," will cause the elements of a torque limiting clutch associated with the steering column to become temporarily dissociated.

The present invention also provides a steering column lock in which the "break-away torque" i.e., that amount of torque which when applied to the steering wheel will cause dissociation of the clutch elements, can be adjusted to any given value between a minimum torque corresponding to slightly greater than maximum expected manual input and a maximum torque corresponding to slightly less than the destruction point of the steering components.

The present invention also provides a steering column lock which locks the shift tube against rotation in either the "PARK" position for automatic transmissions or in the "REVERSE" position for manual transmissions thereby locking the transmission in an inoperative forward drive condition.

BRIEF DESCRIPTION OF THE DRAWINGS

FIG. 1 is a side view partially broken away of the steering column assembly;
FIG. 2 is a side view of the locking mechanism;
FIG. 3 is a side view of the ignition switch;
FIG. 4 is a section view taken along the lines 4—4 of FIG. 3; and
FIG. 5 is a section view taken along the lines 5—5 of FIG 2.

Referring now more particularly to the components as illustrated in FIG. 1 the steering shaft 10 comprises a solid shaft including a pair of generally parallel flat surfaces 11 and 12. The shaft 10 is adapted to be connected at one end (not shown) to the steering linkage of a vehicle generally through a steering gear box. The steering linkage will hereafter be generally referred to as the steered element of the system while the steering wheel will be referred to as the steering element. At its other end 13 the shaft is adapted to be connected to a steering wheel 14. The steering shaft 10 is adapted for rotary steering movement about a first axis 15.

Support means 16 is provided to support the shaft 10 and particularly comprises an outer housing 17, an upper shell member 17A, a jacket 18 and a shift tube 19 of which housing 17 is an integral part and which may be associated with a transmission not shown. The jacket member 18 is fixedly carried by means of a clamp 20 surrounding the outer surfaces thereof and which may be seured to a rigid portion of the vehicle normally the dashboard.

Also incorporated in the dashboard is an ignition switch 21 including a housing 22 and an ignition lock barrel 23. Attached to the shaft of lock barrel 23 is a cam member 25 which is associated with a follower 26. The follower 26 is pivotally attached to a pawl member 27 including an end 28 the purpose of which will soon become apparent. The pawl member 27 is associated with a resilient member 29 which urges the pawl member in a direction generally toward the shaft 10 as illustrated in FIG. 3.

On an upper portion 30 of the steering shaft 10, as shown in FIG. 2, there is mounted a positioning collar 31 surrounding the shaft 10 and affixed to the shaft by a set screw 32 so as to render the collar 31 axially immobile with respect to the shaft 10 when the set screw is tightened. It will be noted however that the axial position of the collar 31 can easily be adjusted by loosening set screw 32 and sliding the collar along the shaft.

A first clutch member 33 is positioned on the shaft 10 abutting the positioning collar 31. The first clutch member 33 defines a circular bore 35 therethrough closely fitting the diametrical portion of shaft 10 and adapted for relative rotation therewith. At least one axial opening or peripheral recess 36 is defined in the wall of the first clutch member 33 extending generally parallel to the axis 15 of the shaft 10 and is adapted to receive the end 28 of pawl member 27. If desired a plurality of such openings may be provided. On a driven end 37 of first clutch member 33 is formed a toothed arrangement consisting of a plurality of teeth 38 and openings 40. The sides 41 of the teeth 38 are inclined, the purpose for which will be later explained.

Positioned next on the steering shaft 10 is a second clutch member 42 defining bore 43 therethrough of slightly larger dimension than the thickness of shaft 10 as measured across the flats 11 and 12, the bore including a pair of generally parallel flat surfaces 44 and 45 which are adapted to engage flat surfaces 11 and 12 of the shaft 10. The second clutch member 42 is adapted to slide axially along the shaft 10 but to be non-rotatable with respect to the shaft. A driving end 46 of second clutch member 42 defines a toothed arrangement including a plurality of teeth 47 and openings 48 designed to matingly engage first clutch member 33. The sides 49 of the teeth 47 are also inclined, the slope corresponding to the slope of the sides 41 of teeth 38.

A second positioning collar 50 is attached to the shaft 10 above second clutch member 42 and is affixed to the shaft 10 by a set screw 51. The axial position of the collar 50 with respect to the shaft 10 can be easily adjusted by loosening set screw 51 and sliding the collar along the shaft. Located between the second clutch member 42 and the positioning collar 50 are a plurality of wavy-type spring washers 52. As can be seen, the purpose for the spring washers 52 is to bias the first and second clutch members into engagement.

The operation of the present invention in summary is as follows: When the vehicle is being operated under normal conditions with the ignition switch in the "ON" position, the pawl 27 and follower 26 will be withdrawn from engagement with shifter tube 19 and first clutch member 33 by cam member 25.

Steering occurs in the normal manner since shaft 10 is always rotatably connected to the steering gear box and thence through the usual linkage to the wheels. The clutch members 33 and 42 perform a function only when the ignition is locked and an attempt is made to turn the steering wheel.

When the vehicle has been brought to a stop and the operator desires to lock the vehicle, the lock barrel 23 of the ignition switch 21 will be rotated counterclockwise until it reaches the "LOCK" position simultaneously causing a rotation of cam member 25 releasing the follower 26 and pawl member 27 connected thereto whereupon spring 29 urges pawl member 27 through opening 53 in shifter tube 19 as shown in FIG. 4 and into engagement with the axial opening 36 in first clutch member 33. The opening 53 in shifter tube 19 is formed such that it will allow the pawl member 27 to pass through tube 19 only when the shifter lever is in the "PARK" position for automatic transmissions or the "REVERSE" position for manual transmissions. If the axial groove 36 is not aligned with the pawl member 27 slight rotation of the steering shaft 10 will bring about the desired alignment whereupon pawl member 27 is then urged by spring 29 into engagement with axial groove 36 thereby restraining rotation of first clutch member 33.

The inclusion of this transmission locking device in no way weakens or impairs the usual steering mechanism and provides a further hindrance to theft of the vehicle. Most steering columns are now the collapsible energy absorbing type which comprise a steering shaft with two flats in telescoping engagement with another shaft member. The clutch members 33 and 42 require no change in the cross-sectional area of the shaft.

The openings or recess 36 may be wide circumferentially as shown in FIG. 4 to permit of a small degree of steering or may be narrow to closely fit pawl 27 thus providing high torque resistance with even small wheel rotation.

As can easily be seen, if first clutch member 33 is restrained against rotation, and second clutch member 42 is in mating engagement with first clutch member 33, second clutch member 42 will also be restrained against rotation and, by virtue of the fact that second clutch member 42 is non-rotatable with respect to said steering shaft 10, rotation of the steering shaft 10 and the steering wheel is also restrained.

If, however, an excessive amount of force is exerted on the steering wheel, such as would be exerted by one desiring to break or overcome the steering shaft lock, the effect will be that second clutch member 42 because of the interaction of the inclined sides 49 of teeth 47 and inclined sides 41 of teeth 38 will be forced upward and out of engagement with the first clutch member 33 thereby compressing the springs 52. Steering wheel 14 and steering shaft 10 will now be allowed to rotate until the two clutch members 42 and 33 are again forced into engagement by spring members 52 again restraining steering wheel 14 and steering shaft 10 against further rotation as previously described.

The torque required to cause dissociation of the clutch members is commonly known as the "break-away torque." By virtue of the axial adjustability of positioning collars 31 and 50 either together or separately this "break-away torque" can be adjusted to any given value between a predetermined minimum and maximum.

The minimum value of "break-away torque" should slightly exceed the maximum torque which could manually be applied to the steering wheel under normal or severe operating conditions. The minimum "break-away torque" should exceed this value so that the restraint imposed by the steering column lock is not easily overcome by manual force.

The maximum value of "break-away torque" should be less than the least amount of torque which when applied to the steering wheel would result in damage to any of the steering components. Limiting the maximum torque to a value under the damage point will operate to prevent damage or destruction to any of the steering components.

It can easily be seen how these maximum and minimum values can vary from car to car or even from model to model depending on the relative size and strength of all steering components. The adjustable positioning collars and/or varying the number of spring washers provide a degree of adaptability and allow the "break-away torque" system to be modified as desired for each application.

When either collar is moved toward the other the effect is to further compress the wave-type spring washers 52 and increase the "break-away torque." When the collars are moved axially away from each other the effect is to reduce the compression of the wave-type spring washers 52 and decrease the "break-away torque."

Thus, it can be seen that if a thief were to attempt to drive the vehicle in its locked condition he would encounter a heavy initial torque resistance which would alternate with a much lower torque resistance to the rotation of the steering wheel which should certainly prove effective in discouraging a thief driving very far.

A further hindrance to driving the car is provided through the shift tube being locked against rotation in either the "PARK" position for automatic transmissions or the "REVERSE" position for manual transmissions.

It has also been shown that because of the unique features of the torque limiting clutch lock, it is virtually impossible to either break the lock or damage the steering mechanism due to an excessive torque being exerted.

It has further been shown that the present invention provides a steering column lock in which the "break-away torque" can be adjusted between a predetermined minimum and maximum value.

While a preferred embodiment of the invention has been specifically disclosed, it is to be understood that the principles of the invention could be applied to other devices as is apparent to those skilled in the art. Therefore, the invention is to be given its broadest interpretation within the scope of the following claims.

What is claimed is:

1. A clutch for a steering column lock including a first clutch member connectable to a shaft for rotation therewith; a second clutch member supportable by the shaft and rotatable with respect to the shaft; a peripheral recess defined by said second clutch member and engageable by a locking means for restraining said second clutch member against rotation, said first and second clutch members capable of assuming either an engaged position or a disengaged position; biasing means associated with at least one of said clutch members urging said clutch members into the engaged position; disengaging means associated with said clutch members adapted to overcome the force exerted by said biasing means and effective to urge said clutch members into the disengaged position when a predetermined torque is exceeded.

2. A clutch for a steering column lock as in claim 1 in which one of said clutch members includes a driving end defining at least one axially extending projection and the other of said clutch members includes a driven end defining at least one axially inwardly extending opening said opening being adapted to matingly receive said axial projection.

3. A clutch for a steering column lock as in claim 2 in which said driving end includes a plurality of axial projections and said driven end includes a plurality of axially inwardly extending openings.

4. A clutch for a steering column lock as in claim 2 in which said axial projection defines a pair of inclined side walls, each of said side walls being inclined at an angle toward the other of said side walls.

5. A clutch for a steering column lock as in claim 2 in which said inwardly extending opening defines a pair of side walls, each of said side walls inclined at an angle away from the other of said side walls.

6. A steering column lock for a vehicle comprising a rotatable shaft; a first clutch member fixed to said shaft for rotation therewith and being axially slidable with respect to said shaft; a second clutch member supported by said shaft and rotatable with respect thereto; a peripheral recess defined by said second clutch member, said recess engageable by a locking means whereby said locking means restrains said second clutch member against rotation with said shaft; biasing means associated with at least one of said clutch members adapted to urge said clutch members into mating relation; disengaging means associated with said clutch members adapted to overcome the force exerted by said biasing means and effective to urge said clutch members out of mating relation when a predetermined torque is exceeded.

7. A steering column lock for a vehicle as in claim 6 including positioning means associated with said first clutch member and said shaft to limit the axial travel of said first clutch member along said shaft.

8. A steering column lock for a vehicle as in claim 7 in which said positioning means includes releasable fastening means for fixing said positioning means to said shaft whereby said positioning means is axially adjustable with relation to said shaft.

9. A steering column lock for a vehicle as in claim 6 including positioning means associated with said second clutch member and said shaft adapted to axially position said second clutch member on said shaft.

10. A steering column lock for a vehicle as in claim 9 in which said positioning means includes releasable fastening means for fixing said positioning means to said shaft whereby said positioning means is axially adjustable with respect to said shaft.

11. A steering column lock for a vehicle as in claim 6 in which one of said clutch members includes a driving end defining at least one axially extending projection and other of said clutch members includes a driven end defining at least one axially inwardly extending opening adapted to matingly receive said axial projection.

12. A steering column lock for a vehicle as in claim 11 in which said driving end includes a plurality of axially extending projections and said driven end includes a plurality of axially inwardly extending openings.

13. A steering column lock for a vehicle as in claim 11 in which said axially extending projection defines a pair of inclined side walls, each of said side walls being inclined at an angle toward the other of said side walls.

14. A steering column lock for a vehicle as in claim 11 in which said inwardly extending opening defines a pair of side walls, each of said side walls inclined at an angle away from the other of said side walls.

15. A steering column lock for a vehicle comprising:
a shaft adapted to be connected to a steering linkage at one end and to a steering wheel at another end;
a housing surrounding said shaft;
a first clutch member associated with said shaft nonrotatable and axially slidable with respect thereto;
a second clutch member associated with said shaft rotatable with respect thereto, adapted to be coupled in mating relationship with said first clutch member and adapted to be restrained by a locking means against rotation with respect to said housing;
biasing means urging said first and second clutch members into mating relation, said biasing means adapted to allow said first and second clutch members to move out of mating relationship when a predetermined torque is exceeded;
locking means effective to restrain rotation of said second clutch member relative to said housing whereby engagement of said second clutch member restrains rotation of said shaft with respect to said housing.

16. A steering column lock for a vehicle as in claim 15, including means defining an ignition switch associated with said locking means, capable of being selectively placed in a plurality of operative positions, said switch adapted, when placed in at least one of said positions, to urge said locking means into contact with said second clutch member, thereby restraining rotation of said second clutch member.

17. A steering column lock for a vehicle as in claim 15 including positioning means associated with said first clutch member and said shaft to limit the axial travel of said first clutch member along said first clutch member along said shaft.

18. A steering column lock for a vehicle as in claim 15 in which said positioning means includes releasable fastening means for fixing said positioning means to said shaft whereby said positioning means is axially adjustable with relation to said shaft.

19. A steering column lock for a vehicle as in claim 15 including positioning means associated with said second clutch member and said shaft adapted to axially position said second clutch member on said shaft.

20. A steering column lock for a vehicle as in claim 15 in which said positioning means includes releasable fastening means for fixing said positioning means to said shaft whereby said positioning means is axially adjustable with relation to said shaft.

21. A steering column lock for a vehicle as in claim 15 in which one of said clutch members includes a driving end defining at least one axial projection and the other of said clutch members includes a driven end defining at least one axially inwardly extending opening adapted to matingly receive said axial projection.

22. A steering column lock for a vehicle as in claim 21 in which said driving end includes a plurality of axial projections and said driven end includes a plurality of axially inwardly extending openings.

23. A steering column lock for a vehicle as in claim 21 in which said axial projection defines a pair of inclined side walls, each of said side walls being inclined at an angle toward the other of said side walls.

24. A steering column lock for a vehicle as in claim 21 in which said inwardly extending opening defines a pair of side walls, each of said side walls inclined at an angle away from the other of said side walls.

25. A steering column lock for a vehicle including: a rotatable steering shaft; a housing surrounding said shaft; a first clutch member fixed to said shaft for rotation therewith and axially slidable with respect thereto, said clutch member including a driving end defining a plurality of axially extending projections, each of said projections defining a pair of side walls inclined toward each other; a second clutch member supported by said shaft, rotatable with respect thereto, said second clutch member including a driven end defining a plurality of axially inwardly extending openings, each of said openings including a pair of side walls inclined away from each other, said openings adapted to matingly receive said axially extending projections of said first clutch member, said second clutch member further defining an opening adapted to receive a locking means, said first and second clutch members operative to assume either an engaged position or a disengaged position; a positioning collar associated with said first clutch member and said shaft to limit the axial travel of said first clutch member along said shaft, said positioning collar including releasable fastening means for fixing said positioning collar to said shaft whereby said positioning collar is axially adjustable with respect to said shaft; a positioning collar associated with said second clutch member and said shaft to limit the axial travel of said first clutch member along said shaft, said positioning collar including releasable fastening means for fixing said positioning collar to said shaft whereby said positioning collar is axially adjustable with respect to said shaft; biasing means disposed between at least one of said clutch members and its corresponding positioning collar, said biasing means adapted to urge said clutch members into the engaged position; disengaging means associated with said clutch members adapted to overcome the force exerted by said biasing means and effective to urge said clutch members into the disengaged position when a predetermined torque is exceeded; locking means effective to restrain rotation of said second clutch member relative to said housing whereby engagement of said second clutch member restrains rotation of said shaft with respect to said housing; an ignition switch connected to said locking means capable of being selectively placed in a plurality of operative positions, said switch adapted, when placed in at least one of said positions, to urge said locking means into contact with said second clutch member, thereby restraining rotation of said second clutch member and said shaft.

26. A steering column lock and transmission shift lock including: a rotatable steering shaft; a transmission shift tube defining an aperture in the side thereof; a transmission shift lever associated with said transmission shift tube; means to support said shaft, and said shift tube in concentric order; releasable jaw clutch means on said shaft including a first clutch member non-rotatably mounted on said shaft and slidable axially thereon, and a second clutch member rotatably mounted on said shaft and fixed axially thereon; biasing means urging said first and second clutch members into engagement; a first abutment means on said shaft positioning said biasing means and a second abutment means on said shaft positioning said second clutch member; a locking pawl member effective to restrain rotation of said second clutch member relative to said shift tube; an ignition switch associated with said locking pawl member such that when the ignition switch is in at least one of several selective positions and the transmission shift lever is in at least one of several positions, said locking pawl member is urged through said aperture in said shift tube locking the transmission in an inoperative forward drive condition.

27. A steering column lock and transmission shift lock as in claim 26 in which said second clutch member further defines an opening adapted to receive said locking pawl member whereby said biasing means, said first clutch member, said locking pawl member and said second clutch member operate to provide a torque restraint against rotation of said steering shaft.

28. A steering column lock and transmission shift lock as in claim 27 including biasing means associated with said pawl member whereby said biasing means is adapted to urge said pawl member into engagement with said shift tube and said second clutch member when said ignition switch and said transmission shift lever are in non-operative forward drive positions.

References Cited

UNITED STATES PATENTS

| | | | |
|---|---|---|---|
| 1,565,754 | 12/1925 | Orth | 64—29 |
| 2,017,530 | 10/1935 | De Orlow | 70—223 |
| 2,063,708 | 12/1936 | Swilens | 70—134 |
| 2,481,832 | 9/1949 | Floraday | 64—30 |

FOREIGN PATENTS

| | | | |
|---|---|---|---|
| 200,739 | 2/1956 | Australia | 70—422 |

OTHER REFERENCES

Mechanical Engineers Handbook, Design and Productive Volume, 1950.

MARVIN A. CHAMPION, Primary Examiner

R. L. WOLFE, Assistant Examiner

U.S. Cl. X.R.

70—243, 422